March 31, 1970 H. STOPPER 3,504,192
EMITTER-COUPLED LOGIC CIRCUIT
Filed June 30, 1967 2 Sheets-Sheet 1
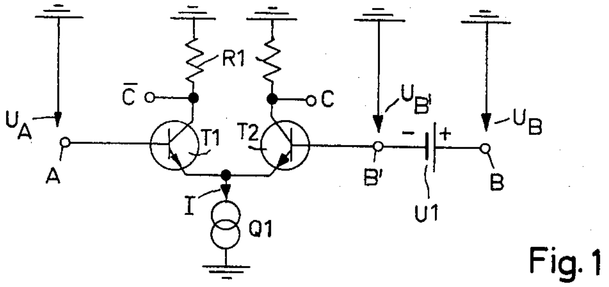
Fig. 1
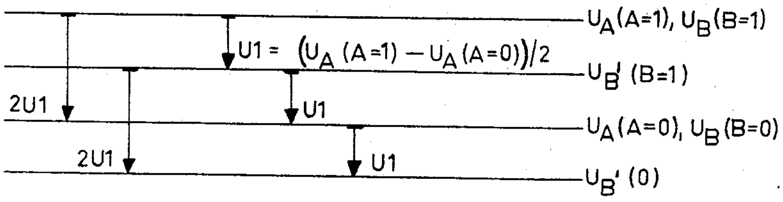
Fig. 2
| A | B | C |
|---|---|---|
| 0 | 0 | 1 |
| 0 | 1 | 0 |
| 1 | 0 | 1 |
| 1 | 1 | 1 |
Fig. 3
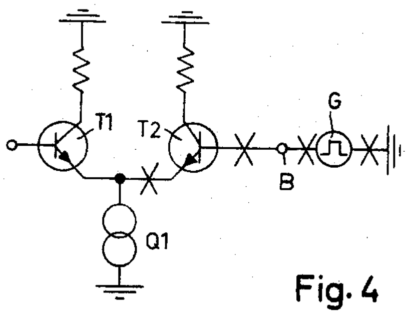
Fig. 4
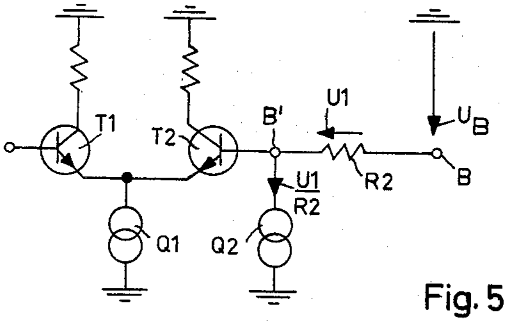
Fig. 5
Inventor:
Herbert Stopper
By: Spencer & Kaye
Attorneys Inventor:
Herbert Stopper
By: Spencer & Kaye
Attorneys United States Patent Office 3,504,192
Patented Mar. 31, 1970

3,504,192

EMITTER-COUPLED LOGIC CIRCUIT

Herbert Stopper, Litzelstetten, Germany, assignor to Telefunken Patentverwertungsgesellschaft m.b.H., Ulm (Danube), Germany Filed June 30, 1967, Ser. No. 650,300
Claims priority, application Germany, July 30, 1966, T 31,738
Int. Cl. H03k *19/08*
U.S. Cl. 307—203 8 Claims

ABSTRACT OF THE DISCLOSURE

Emitter-coupled logic circuits which comprise two transistors are so designated that, if the logic signal controlling the one transistor is designated by B and the logic signal controlling the other transistor is designated by A, the output signal C is formed by the functions $C=A+\overline{B}$ and $\overline{C}=\overline{A}.B$, in contrast to known ECL-circuits wherein the output signal C corresponds to the function $C=A$ and $\overline{C}=\overline{A}$.

This invention relates to a logic circuit comprising two transistors, the emitters of which are connected together and are also connected through a current-supply circuit to the one pole of a voltage supply source and the collector resistors of which are connected to the other pole of the said voltage supply source, the transistors assuming opposite switching states which change in dependence on the applied control signal.

Such circuits are known inter alia under the name emitter-coupled logic (ECL) circuits and are described for example in Nerem Record 1965, pages 174 and 175. Their switching state given by the opposite state of conductivity of the two transistors is obtained as a result of the fact that the base of the one transistor is controlled by a fixed reference voltage and the base of the other transistor by a signal, the voltage values of which signal swing are symmetrical with respect to the reference voltage. Depending on the state of the signal, the one or the other transistor is then conducting, namely the one to the base of which the higher switching voltage is applied. The collector of the one transistor thus supplies the regenerated input variable and its negation appears at the collector of the other transistor. These circuits can only be given an extended logic function through replacing the said other transistor by a plurality of transistors, of which each is controlled by another variable. Extended in this manner they display an OR/NOR behaviour.

The invention provides a logic circuit of the kind stated at the beginning which circuit has an increased logic capability in comparison with the known circuits without additional expenditure on component parts. According to the invention, the increased logic capability is obtained in such a manner that, connected in series with the control circuit for the one transistor T2 is a voltage source U1 which has a lower voltage in comparison with the voltage swing in the control signals, preferably the voltage of half the voltage swing in a control signal. If the logic variable controlling the one transistor is designated by B and the logic variable controlling the other transistor is designated by A and the result of the logical combination is designated by C, then is in the circuit according to the invention $C=A+\overline{B}$, $\overline{C}=\overline{A}.B$, whereas the known circuits only form the functions $C=A$, $\overline{C}=\overline{A}$.

With regard to the further developments of the invention, reference is made to the sub-claims.

Examples of the invention and of its further developments are explained below with reference to the accompanying drawings in which:

FIGURE 1 shows a logic circuit according to the invention;

FIGURE 2 shows the levels of the control signals for the circuit shown in FIGURE 1;

FIGURE 3 shows a logic truth table for the circuit shown in FIGURE 1;

FIGURE 4 shows the circuit of FIGURE 1 and indicates possible introduction points for a series voltage source into the control circuit for the one transistor;

FIGURE 5 shows a circuit for the realisation of a series-voltage source;

Components which are used in several figures always bear the same reference numerals.

Figure 6A:
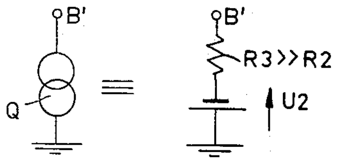
FIGURE 6 is an explanation of the circuit in FIGURE 5.

The logic circuit shown in FIGURE 1 comprises two transistors T1 and T2, the collector resistors R1 of which are connected to earth and the emitters of which are connected together and likewise lead to earth through a current source Q1. The current source Q1 supplies a constant current I which is lower than the saturation current of the transistors. The base of the transistor T1 is connected to one input terminal A and the base of the transistor T2 is connected through a voltage source U1 to an input terminal B. The logic signals appearing at the input terminals A and B may bear the names of their terminals here and hereinafter. FIGURE 2 shows the relative position of the signal levels. The top line $U_A(A=1)$, $U_B(B=1)$ gives the relative level of the signals for $A=1$ and $B=1$, the line $U_A(A=0)$, $U_B(B=0)$ gives that for $A=0$ and $B=0$. The control voltage $U_B'$ of the transistor T2, which is reduced by U1 in comparison with $U_{B'}$ lies for $B=1$ between the voltages $U_A(A=1)$ and $U_A(A=0)$, preferably in the middle between the two (line $U_{B'}(B=1)$). $U_{B'}(B=0)$ is correspondingly reduced by the same amount U1 in comparison with $U_B(B=0)$. Because of the construction of the logic circuit in FIGURE 1 like a difference amplifier, that transistor to which the more positive control voltage is applied (in the case of npn substrate transistors) is in the lower resistance state in each case. Taking this fact into consideration, the truth table of FIGURE 3 is obtained, from which follows: $C=A+\overline{B}$, $\overline{C}=\overline{A}.B$.

So long as the output signals C and $\overline{C}$ of the circuit can be regarded separately from the input signals A and B as regards level, although the polarity with which the voltage source U1 is connected in series with the base of the transistor T1 is important for the dimensioning of the circuit, nevertheless it is immaterial as regards its function, provided that the conditions for avoiding transistor saturation are adhered to. However, when it is necessary to build up similar circuits with the output signals C and $\overline{C}$ without further great expense for level adjustment, the polarity must be as in FIGURE 1 when npn substrate transistors are used.

It is also immaterial, as regards the function of the circuit, at which point in the control circuit of the transistor T2 the voltage U1 is introduced. FIGURE 4 shows this. In it, the input terminal B of the circuit shown in FIGURE 1 is connected to earth through a signal-voltage generator G, and the control circuit of the transistor, starting from this earth connection, is closed through the current source Q1 and its emitter-to-base path. Points which may be selected for the insertion of the voltage source U1 are marked by crosses. Accordingly, the voltage source may be introduced into the emitter supply line of the transistor T2, or at any point between its base and the signal generator, or between the signal generator G and earth. Its introduction between the base and the signal generator, particularly here between the base and the input terminal B, is merely a preferred embodiment, and this will be discussed in more detail below.

In FIGURE 5, the voltage source U1 of FIGURE 1 is formed by a current source Q2 and a resistor R2. The current source Q2 is connected between the base of the transistor T2 and earth for example, and it delivers a current $U1/R2$ in comparison with which the base current of the transistor T2 is negligible. The resistor R2 is connected between the base and the input terminal B. Assuming that there is a low-resistance control of the input terminal B, the voltage at the base of the transistor T2 is more negative by $(U1/R2)R2$ than the signal B with all controls of the input terminal B.

A first possible embodiment of the current source Q2 as well as for the current source Q1 consists in the series connection of a voltage source U2 with a resistor R3, in which case the latter must be large in comparison with the resistor R2 in order to have in the case of Q2 approximately the characteristics of the current source defined in connection with FIGURE 5. This first possible embodiment is shown in FIGURE 6*a*.

Figure 6B:
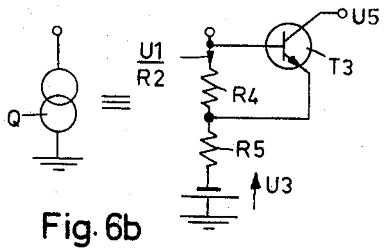

A second embodiment of the current sources is shown in FIGURE 6*b*. Here the current source consists of a series connection of a voltage source U3 with two resistors R5 and R4 which in this sequence are connected between earth and the source connection point (point B' for the source Q2). The emitter of a transistor T3 is connected to the junction point between the resistors R4 and R5. The base of this transistor is connected to the other connection point of the resistor R4. An auxiliary voltage U5 is connected to the collector of the transistor. The mode of operation of this circuit is based on the sharply curved emitter characteristic of the transistor according to which small variations in the base-to-emitter voltage are converted into large variations of the emitter current. A variation in the base-to-emitter voltage leads to a variation in the same sense in the emitter current which in turn causes a variation in the same sense in the voltage at the resistor R5. Thus the transistor T3 causes a flow into the voltage divider composed of the resistors R4 and R5 and this maintains the base-to-emitter voltage constant. Since the base current of the transistor is negligible in comparison with the current through the resistor R4, a constant base-to-emitter voltage at the transistor T3 also means a constant current through resistor R4. The resistances of the resistors R4 and R5 as well as the voltage U5 depend on the current to be obtained. The dimensioning of the current sources Q1 and Q2 will therefore generally be different. The important advantages of this current source lie in its low power loss and its low capacitance. The latter is particularly important in connection with monolithically integrated circuits. In this technique, the transistors have a considerable capacitance between the collector and earth which renders the use of the collector-to-emitter path of such transistors substantially impossible as a current regulating element at very high frequencies.

Figure 7:
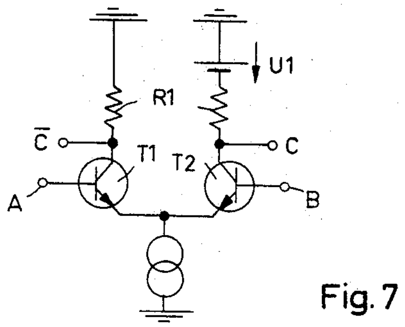
FIGURE 7 shows another possibility for realising a series-voltage source.

It was stated in connection with FIGURE 4 that the voltage source may also be introduced between the signal generator G and earth. Every logic circuit may serve as a signal generator for other circuits connected to its output. Since the collector resistors R1 and the transistors T1 and T2 (see FIGURE 1) must be regarded as internal resistance in the circuits under discussion, the voltage source U1 must be introduced between earth and the collector resistor R1 of the output in question. FIGURE 7 shows this arrangement. There a voltage source U1 is connected between the resistor R1 of the output C and earth. In a logic system, which uses the circuit shown in FIGURE 7, C-outputs should only be connected associated with B-inputs and $\overline{C}$-outputs with A-inputs. This restriction results from the fact that the two transistors T1 and T2 in each circuit have different supply voltages and hence different collector voltages and consequently permit maximum control voltages of different magnitudes with a view to protecting the transistor from saturation. It is naturally also possible to connect a voltage source U1 into the collector arm of the transistor T1, only, in which case appropriate control restrictions must be taken into consideration as well as level adaptations for this transistor.

FIGURE 8 again shows the circuit of FIGURE 5 but in extended form. The current sources Q1 and Q2 of FIGURE 5 are here replaced by those shown in FIGURE 6*b*, as a result of which the circuit becomes well suited for use in the monolithically integrated technique. The two current sources have a common voltage source $U3=-U$. The input terminal A is controlled by two emitter followers. These are formed by transistors T41 and T42 and an emitter resistor R6 which is common to both transistors. The collectors of these transistors are connected to earth. Thus: $A=A1+A2$. In a similar manner, two emitter followers are formed by two further transistors T51 and T52 together with the resistor R2 and the current source Q2 connected into the base circuit of the transistor T2. Since these emitter followers receive the current supplied by the current source, the latter may be regarded as a controlled emitter resistor. Accordingly, the introduction of the current source Q2 does not lead to any additional power loss for the circuit. This is particularly important for integrated circuits. $B=B1+B2$ applies to the control of the input terminal B. Thus:

$$C=A1+A2+\overline{\overline{B1}+\overline{B2}}$$

$$\overline{C}=\overline{A1}\cdot\overline{A2}\cdot(B1+B2)$$

By adding further transistors T4*i* and T5*i*, this function can naturally be extended to $$C=A1+A2+\cdot\cdot+Ai+\overline{B1+B2+\cdot\cdot+Bi}$$

It is also possible to extend the function by multiplication (parallel connection) of the transistors T1 and T2. In this case, each of these transistors must be controlled in a similar manner to the control of transistors T1 and T2 in FIGURE 8*a*.

Apart from the performing logic functions, the transistors T41, T42 and T51, T52 are also responsible for the level adjustment. The output signals C, $\overline{C}$ of the circuit in FIGURE 8*a* assume selectively the voltages 0 volt and $-I\cdot R1$. They are used directly for the control of the transistors T41, T42 and T51, T52 respectively in similar circuits. The signal levels at the points A and B are thus lower than the output levels of C and $\overline{C}$ by the voltage drop at the emitter diode of the preceding transistors in each case. In this manner, operation of the transistor T1 (collector-to-base voltage is positive) without saturation is assured.

In considering the comparative expense on component parts, it may appear at first glance that the circuit according to the invention, using as it does a current source in accordance with FIGURE 6*b* to produce the voltage U1, needs one transistor more than comparable circuits of the prior art. This is not the case, however. In order to render operation of the known circuits possible within a comparatively wide temperature range, the reference voltage is supplied to the one transistor in these circuits through a transistor stage acting as an emitter follower which imparts the required temperature response to the reference voltage. This temperature response of the control voltage for the transistor T2 which is necessary in itself in order to adhere to an optimum signal-to-noise-ratio and in order to avoid transistor saturation, is afforded precisely by the current source Q2 when the temperature coefficient of its transistor coincides with that of the other transistors and the temperature coefficient of its resistors coincides with that of the other resistors.

Figure 8A:
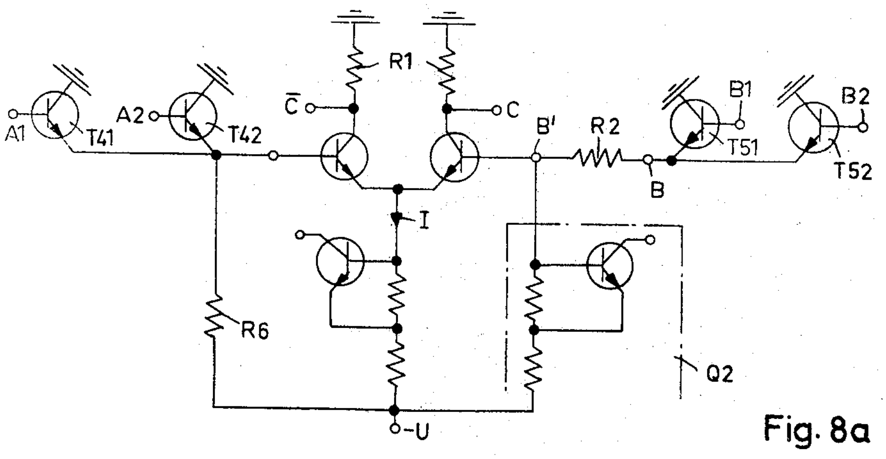
FIGURE 8 shows a logic circuit according to FIGURE 5 with control circuits.
Figure 8B:
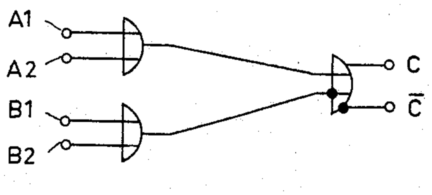

FIGURE 8*b* shows the logic equivalent circuit diagram of the circuit shown in FIGURE 8*a*. As a result of connecting the output $\overline{C}$ to the input B1 (or B2), this arrangement becomes a complete RS-flip-flop with A1 or A2 as set input and B2 as reset input. According to the cited prior art, two OR/NOR networks would otherwise be needed to carry out this task. The combination value of the logic produced by the circuit according to the invention thus goes far beyond that of the known circuits without its power loss and its switching delay being markedly increased by the additional control transistors T51 and T52.

The circuit according to the invention may be executed by any technique. The circuit shown in FIGURE 8 is particularly advantageous for construction in monolithic integrated form.

What I claim as new and desire to secure by Letters Patent of the United States is:

1. A logic circuit comprising two transistors, the emitters of which are connected together and are also connected through a current supply circuit to the one pole of a voltage supply source and the collector resistors of which are connected to the other pole of the said voltage supply source, the transistors assuming opposite switching states which change depending on the particular control signal, characterised in that a voltage source (U1) is connected in series with the control circuit of the one transistor (T2) which voltage source has a lower voltage in comparison with the voltage swing of the control signals.

2. A logic circuit as claimed in claim 1, wherein the voltage of the said voltage source is half the voltage swing of the control signal.

3. A logic circuit as claimed in claim 1, wherein the polarity of the voltage source (U1) is such that it lowers the control voltage appearing between the base of the one transistor (T2) and the one pole (—U) of the voltage supply source.

4. A logic circuit as claimed in claim 3, wherein, in order to reduce the control voltage, a first resistor (R3) is connected between the base of the one transistor (T2) and a derived voltage (U2), and a second resistor (R2) which has a low resistance in comparison with the first resistor, is connected between this base and the pulse supply point (B), and that the derived voltage has such a magnitude that the component voltage at the second resistor is equal to the voltage of half the voltage swing of the control signal.

5. A logic circuit as claimed in claim 4, wherein the first resistor (R3) is formed by a regulating circuit (R4, R5, T3) which supplies a substantially constant current independent of its load.

6. A logic circuit as claimed in claim 5, wherein the regulating circuit consists of the series connection of two resistors (R4, R5), from the junction point of which extends the load path of a third transistor (T3) to an auxiliary voltage (U5), the control path of which transistor being connected to the resistor (R4) adjacent to the base of the one transistor (T2), and wherein the auxiliary voltage (U5) has such a magnitude and the two resistors (R4, R5) have such a resistance that the voltage drop at the resistor (R4) controlling the third transistor (T3) remains substantially constant regardless of the particular control of the one transistor (T2).

7. A logic circuit as claimed in claim 4, wherein its two transistors (T1, T2) are controlled through emitter follower stages, and the series connection of the first resistor (R3) and second resistor (R2) forms the emitter resistance of the emitter follower stage controlling the one transistor (T2).

8. A logic circuit as claimed in claim 3, wherein the voltage source (U1) is connected between the collector resistor (R1) of the one transistor (T2) and the other pole of the supply voltage source (U).

References Cited

UNITED STATES PATENTS

| | | | |
|---|---|---|---|
| 3,140,405 | 7/1964 | Kolling | 307—203 X |
| 3,329,835 | 7/1967 | D'Agostino | 307—215 |
| 3,417,261 | 12/1968 | Walsh | 307—218 X |

DONALD D. FORRER, Primary Examiner

U.S. Cl. X.R.

307—207, 217, 218